US012793605B2

(12) United States Patent
Chen et al.

(10) Patent No.: US 12,793,605 B2
(45) Date of Patent: Nov. 10, 2026

(54) TIMING CONTROLLER AND POLARITY CONTROL METHOD THEREOF

(71) Applicant: Novatek Microelectronics Corp., Hsinchu (TW)

(72) Inventors: Li-Chieh Chen, Hsinchu City (TW); Yen-Tao Liao, Hsinchu City (TW)

(73) Assignee: Novatek Microelectronics Corp., Hsinchu (TW)

( * ) Notice: Subject to any disclaimer, the term of this patent is extended or adjusted under 35 U.S.C. 154(b) by 649 days.

(21) Appl. No.: 17/984,247

(22) Filed: Nov. 10, 2022

(65) Prior Publication Data

US 2024/0161680 A1 May 16, 2024

(51) Int. Cl.
*G09G 3/20* (2006.01)
*G09G 3/36* (2006.01)

(52) U.S. Cl.
CPC ......... *G09G 3/2096* (2013.01); *G09G 3/3614* (2013.01); *G09G 3/3685* (2013.01); *G09G 3/2074* (2013.01); *G09G 3/3688* (2013.01); *G09G 3/3696* (2013.01); *G09G 2310/0291* (2013.01); *G09G 2330/12* (2013.01)

(58) Field of Classification Search
CPC .. G09G 3/2096; G09G 3/3614; G09G 3/3685; G09G 2310/0291; G09G 2330/12; G09G 3/3688; G09G 3/3696; G09G 3/2074
See application file for complete search history.

(56) References Cited

U.S. PATENT DOCUMENTS

| | | | | |
|---|---|---|---|---|
| 9,047,839 | B2 | 6/2015 | Teranishi | |
| 10,957,236 | B2 | 3/2021 | Liao et al. | |
| 2004/0178981 | A1* | 9/2004 | Asada ................. | G09G 3/3614 345/96 |
| 2013/0057520 | A1 | 3/2013 | Hsiao et al. | |

(Continued)

FOREIGN PATENT DOCUMENTS

| | | | |
|---|---|---|---|
| CN | 103293729 | A | 9/2013 |
| CN | 106531113 | | 3/2017 |

(Continued)

OTHER PUBLICATIONS

"Office Action of Taiwan Counterpart Application", issued on Oct. 27, 2023, p. 1-p. 5.

(Continued)

*Primary Examiner* — William Boddie
*Assistant Examiner* — Saifeldin E Elnafia
(74) *Attorney, Agent, or Firm* — JCIPRNET

(57) ABSTRACT

A timing controller and a polarity control method thereof are provided. The timing controller includes a line buffer and a check circuit. The line buffer temporarily stores a plurality of sub-pixel data of a current sub-pixel row in an image frame so as to transmit the plurality of sub-pixel data of the current sub-pixel row to a source driver. The check circuit generates a polarity command corresponding to the current sub-pixel row for the source driver to set a polarity inversion mode of the current sub-pixel row. The check circuit checks the plurality of sub-pixel data of the current sub-pixel row so (Continued)

as to determine whether to dynamically change the polarity inversion mode of the current sub-pixel row.

42 Claims, 8 Drawing Sheets

(56) References Cited

U.S. PATENT DOCUMENTS

| | | | | |
|---|---|---|---|---|
| 2016/0104404 | A1* | 4/2016 | Peng | G09G 3/006 345/205 |
| 2016/0225335 | A1* | 8/2016 | Kim | G09G 3/3685 |
| 2017/0256194 | A1 | 9/2017 | Kim et al. | |
| 2021/0097926 | A1* | 4/2021 | Sun | G09G 3/2074 |
| 2021/0193064 | A1 | 6/2021 | Piao et al. | |

FOREIGN PATENT DOCUMENTS

| | | |
|---|---|---|
| CN | 106997754 | 8/2017 |
| CN | 111862897 A | 10/2020 |
| JP | 2006284825 | 10/2006 |
| TW | 201312529 | 3/2013 |
| TW | 201933306 | 8/2019 |

OTHER PUBLICATIONS

"Office Action of China counterpart Application", issued on Nov. 1, 2025, p. 1-p. 16.

* cited by examiner

TIMING CONTROLLER AND POLARITY CONTROL METHOD THEREOF

BACKGROUND

Technical Field

The disclosure relates to a display device. In particular, the disclosure relates to a timing controller and a polarity control method thereof.

Description of Related Art

For a liquid-crystal display (LCD), a common voltage Vcom is a reference voltage for liquid crystal rotation. In a sub-pixel circuit of a display panel, two electrodes of a liquid crystal capacitor are respectively applied with the common voltage Vcom and a grayscale voltage to rotate liquid crystal molecules. When liquid crystal electrodes are applied with different grayscale voltages, the liquid crystal may rotate at different angles, providing different light transmittances. Ideally, the common voltage Vcom is constant. Practically, however, a level of the common voltage Vcom may drift due to the coupling effects. If the common voltage Vcom is not stable, the actual brightness of the sub-pixel circuit may be different from a target brightness. How to reduce the level drift of the common voltage Vcom is one of many technical issues in the related technical field.

SUMMARY

The disclosure provides a timing controller and a polarity control method thereof to reduce a level drift of a common voltage of a display panel.

In an embodiment of the disclosure, the timing controller includes a line buffer and a check circuit. The line buffer is configured to temporarily store a plurality of sub-pixel data of a current sub-pixel row in an image frame so as to transmit the plurality of sub-pixel data of the current sub-pixel row to a source driver. The check circuit is configured to generate a polarity command corresponding to the current sub-pixel row for the source driver to set a polarity inversion mode of the current sub-pixel row. The check circuit checks the plurality of sub-pixel data of the current sub-pixel row so as to determine whether to dynamically change the polarity inversion mode of the current sub-pixel row.

In an embodiment of the disclosure, the polarity control method includes the following. A plurality of sub-pixel data of a current sub-pixel row in an image frame is temporarily stored by a line buffer of the timing controller so as to transmit the plurality of sub-pixel data of the current sub-pixel row to a source driver. The plurality of sub-pixel data of the current sub-pixel row is checked by a check circuit of the timing controller so as to determine whether to dynamically change a polarity inversion mode of the current sub-pixel row. A polarity command corresponding to the current sub-pixel row is generated by the check circuit for the source driver to set the polarity inversion mode of the current sub-pixel row.

In an embodiment of the disclosure, the timing controller includes a line buffer and a check circuit. The line buffer is configured to temporarily store a plurality of sub-pixel data of a current sub-pixel row in an image frame so as to transmit the plurality of sub-pixel data of the current sub-pixel row to a source driver. The check circuit is configured to check whether a polarity inversion mode of a previous sub-pixel row in the image frame is changed from a default mode to a new mode. The check circuit generates a polarity command corresponding to the current sub-pixel row for the source driver to set a polarity inversion mode of the current sub-pixel row. In the case where the polarity inversion mode of the previous sub-pixel row is changed from the default mode to the new mode, the check circuit maintains the polarity inversion mode of the current sub-pixel row in the default mode. In the case where the polarity inversion mode of the previous sub-pixel row is maintained in the default mode, the check circuit checks the plurality of sub-pixel data of the current sub-pixel row so as to determine whether to dynamically change the polarity inversion mode of the current sub-pixel row.

In an embodiment of the disclosure, the polarity control method includes the following. A plurality of sub-pixel data of a current sub-pixel row in an image frame is temporarily stored by a line buffer of the timing controller so as to transmit the plurality of sub-pixel data of the current sub-pixel row to a source driver. Whether a polarity inversion mode of a previous sub-pixel row in the image frame is changed from a default mode to a new mode is checked by a check circuit of the timing controller. In the case where the polarity inversion mode of the previous sub-pixel row is changed from the default mode to the new mode, a polarity inversion mode of the current sub-pixel row is maintained in the default mode by the check circuit. In the case where the polarity inversion mode of the previous sub-pixel row is maintained in the default mode, the plurality of sub-pixel data of the current sub-pixel row is checked by the check circuit so as to determine whether to dynamically change the polarity inversion mode of the current sub-pixel row. A polarity command corresponding to the current sub-pixel row is generated by the check circuit for the source driver to set the polarity inversion mode of the current sub-pixel row.

Based on the foregoing, the timing controller according to the embodiments of the disclosure may perform line-based polarity control. For example, in some embodiments, the determination/adjustment of the polarity inversion modes of different sub-pixel rows may be independent of each other. The timing controller may check a plurality of sub-pixel data of the current sub-pixel row so as to determine whether to dynamically change the polarity inversion mode of the current sub-pixel row. For example, the timing controller may select one of the plurality of candidate polarity inversion modes as the polarity inversion mode of the current sub-pixel row according to the plurality of sub-pixel data of the current sub-pixel row, to maximally reduce the coupling effects of the plurality of driving voltages (grayscale voltages) of the current sub-pixel row on the common voltage of the display panel. Therefore, the timing controller may reduce the level drift of the common voltage.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
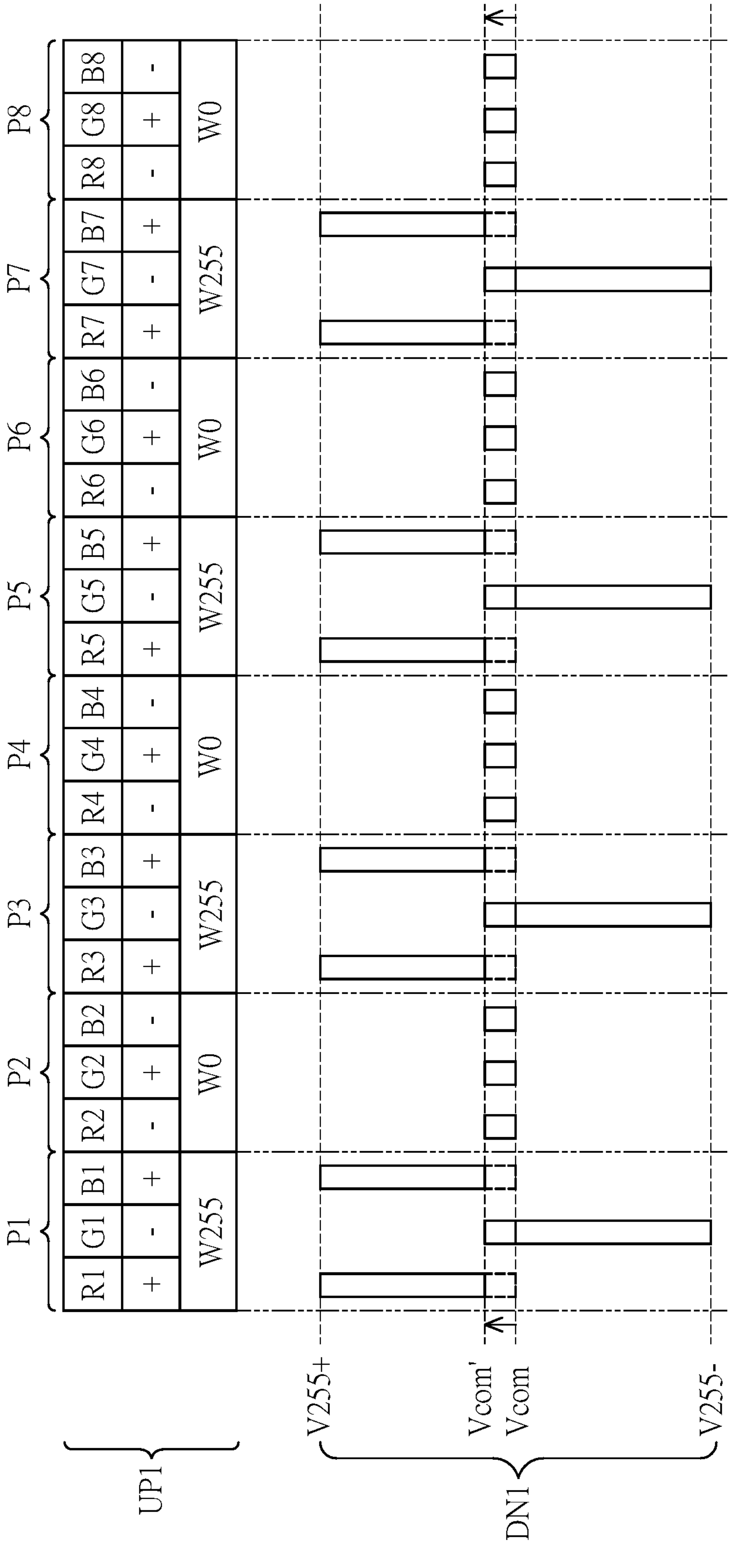
FIG. 1 is a schematic diagram of a polarity inversion mode of a current sub-pixel row.

The term “coupling (or connection)” as used throughout this specification (including the claims) may refer to any direct or indirect means of connection. For example, if it is herein described that a first device is coupled (or connected) to a second device, it should be interpreted that the first device may be directly connected to the second device, or the first device may be indirectly connected to the second device through other devices or some connection means. Terms such as “first” and “second” mentioned through out the specification (including the claims) are used to name elements, or to distinguish between different embodiments or scopes, and are not used to limit the upper or lower bound of the number of elements, nor used to limit the sequence of elements. In addition, wherever possible, elements/members/steps using the same reference numerals in the drawings and embodiments denote the same or similar parts. Cross-reference may be made to relevant descriptions of elements/members/steps using the same reference numerals or using the same terms in different embodiments.

FIG. 1 is a schematic diagram of a polarity inversion mode of a current sub-pixel row. The upper part UP1 of FIG. 1 shows a plurality of pixel data of a current sub-pixel row and a polarity inversion mode thereof. In the embodiment shown in FIG. 1, it is assumed that the current sub-pixel row includes pixels P1, P2, P3, P4, P5, P6, P7, and P8. The pixel P1 includes a red sub-pixel R1, a green sub-pixel G1, and a blue sub-pixel B1. By analogy, the pixel P2 includes sub-pixels R2, G2, and B2; the pixel P3 includes sub-pixels R3, G3, and B3; the pixel P4 includes sub-pixels R4, G4, and B4; the pixel P5 includes sub-pixels R5, G5, and B5; the pixel P6 includes sub-pixels R6, G6, and B6; the pixel P7 includes sub-pixels R7, G7, and B7; and the pixel P8 includes sub-pixels R8, G8, and B8. In the embodiment shown in FIG. 1, it is assumed that pixel data of the pixels P1, P3, P5, and P7 are W255 (indicating white color of the maximal grayscale), and pixel data of the pixel P2, P4, P6, and P8 are WO (indicating white color of the minimal grayscale). Generally speaking, white pixel data indicates that red sub-pixel data, green sub-pixel data, and blue sub-pixel data thereof are identical to each other.

A source driver may convert a plurality of sub-pixel data of the current sub-pixel row into a plurality of driving voltages (grayscale voltages), and then output the driving voltages to different data lines (also referred to as source lines) of a display panel. The symbol “+” as shown in the upper part UP1 of FIG. 1 indicates that the sub-pixel data is converted to a positive polarity driving voltage, and the symbol “−” indicates that the sub-pixel data is converted to a negative polarity driving voltage. In the embodiment shown in FIG. 1, it is assumed that a polarity inversion mode of the current sub-pixel row is the “H1Dot” mode, that is, a polarity configuration of “+, −, +, −, +, −, . . . ”.

The lower part DN1 of FIG. 1 shows a schematic diagram of voltage levels of the driving voltages. The source driver may convert the plurality of sub-pixel data shown in FIG. 1 into a plurality of driving voltages. In the embodiment shown in FIG. 1, it is assumed that the source driver converts sub-pixel data “255” of a positive polarity “+” into a driving voltage V255+, and converts sub-pixel data “255” of a negative polarity “−” into a driving voltage V255−, as shown in FIG. 1. By analogy, the source driver converts sub-pixel data “0” of a positive polarity “+” into a common voltage Vcom, and converts sub-pixel data “0” of a negative polarity “−” into the common voltage Vcom. The source driver may output the driving voltages to different data lines of the display panel. Voltage transitions of the data lines may be coupled to common voltage electrodes of the display panel, shifting the level of the common voltage Vcom to an erroneous level Vcom'. Based on the erroneous level Vcom', an error occurs in the voltage difference between two ends of a liquid crystal capacitor of a sub-pixel circuit, as shown in the lower part DN1 of FIG. 1.

Figure 2:
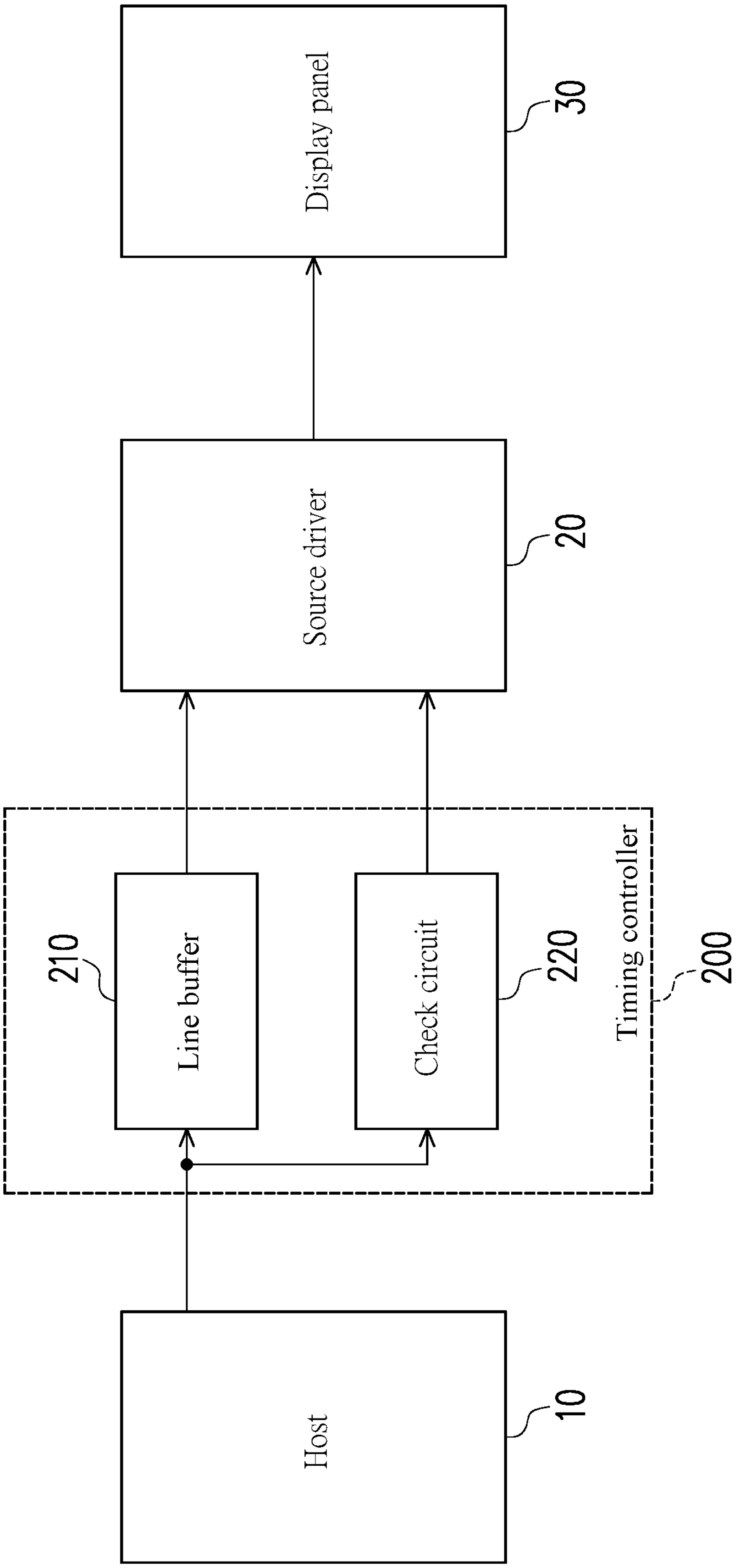
FIG. 2 is a schematic circuit block diagram of a timing controller according to an embodiment of the disclosure.

FIG. 2 is a schematic circuit block diagram of a timing controller 200 according to an embodiment of the disclosure. The timing controller 200 shown in FIG. 2 is coupled to a host to receive a sub-pixel data stream. The timing controller 200 is coupled to a source driver 20 to provide a plurality of sub-pixel data of a current sub-pixel row. Based on the data buffering of the line buffer 210, the timing controller 200 transmits a polarity command corresponding to the current sub-pixel row to the source driver 20 synchronously (real time manner without delay) with transmitting the plurality of sub-pixel data of the current sub-pixel row to the source driver 20. Based on the polarity command, the source driver 20 may convert the plurality of sub-pixel data of the current sub-pixel row into a plurality of driving voltages (grayscale voltages), and then outputs the driving voltages to different data lines (also referred to as source lines) of a display panel 30.

In the embodiment shown in FIG. 2, the timing controller 200 includes a line buffer 210 and a check circuit 220. The line buffer 210 may temporarily store the plurality of sub-pixel data of the current sub-pixel row in an image frame so as to transmit the plurality of sub-pixel data of the current sub-pixel row to the source driver 20. The check circuit 220 may generate the polarity command corresponding to the current sub-pixel row for the source driver 20 to set a polarity inversion mode of the current sub-pixel row. The check circuit 220 may transmit the polarity command corresponding to the current sub-pixel row to the source driver 20 synchronously with the line buffer 210 transmitting the plurality of sub-pixel data of the current sub-pixel row to the source driver 20. Based on this, the timing controller 200 according to this embodiment may perform line-based polarity control.

Figure 3:
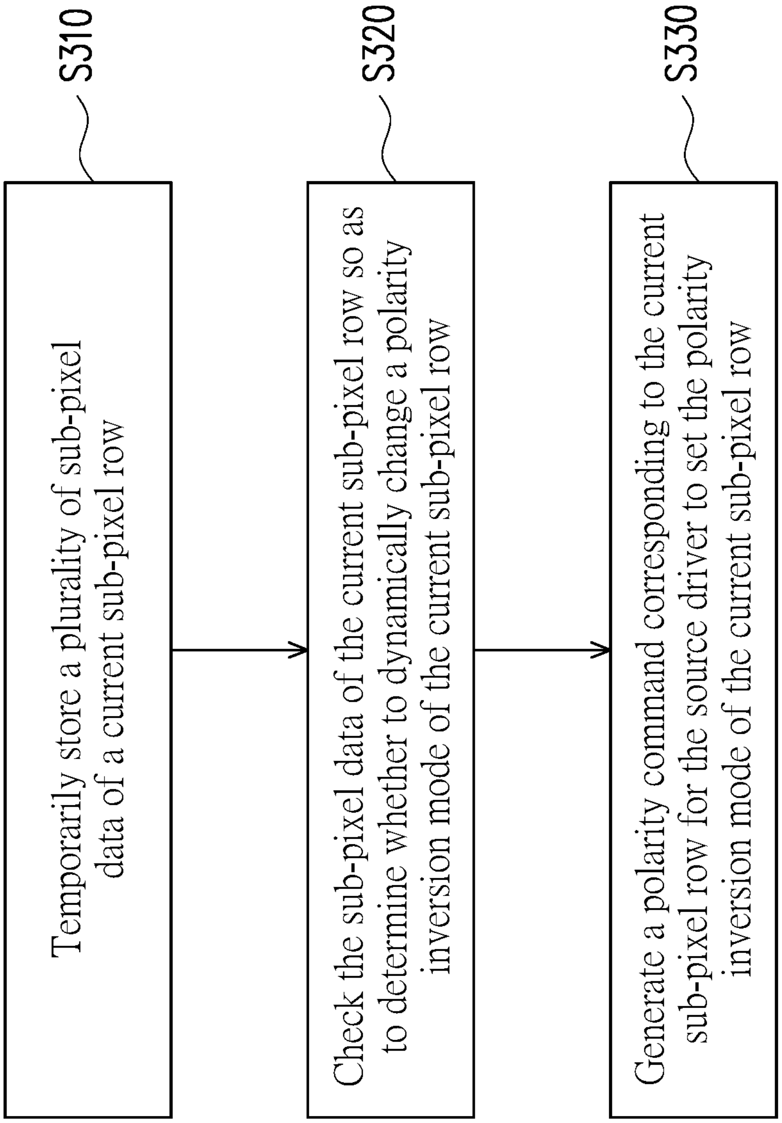
FIG. 3 is a schematic flowchart of a polarity control method of the timing controller according to an embodiment of the disclosure.

FIG. 3 is a schematic flowchart of a polarity control method of the timing controller 200 according to an embodiment of the disclosure. Reference may be made to FIG. 2 and FIG. 3. In step S310, the line buffer 210 temporarily stores a plurality of sub-pixel data of a current sub-pixel row in an image frame so as to transmit the plurality of sub-pixel data of the current sub-pixel row to the source driver 20. In step S320, the check circuit 220 may check the plurality of sub-pixel data of the current sub-pixel row so as to determine whether to dynamically change a polarity inversion mode of the current sub-pixel row. In step S330, based on a result of checking in step S320, the check circuit 220 may generate a polarity command corresponding to the current sub-pixel row for the source driver 20 to set the polarity inversion mode of the current sub-pixel row.

Figure 4:
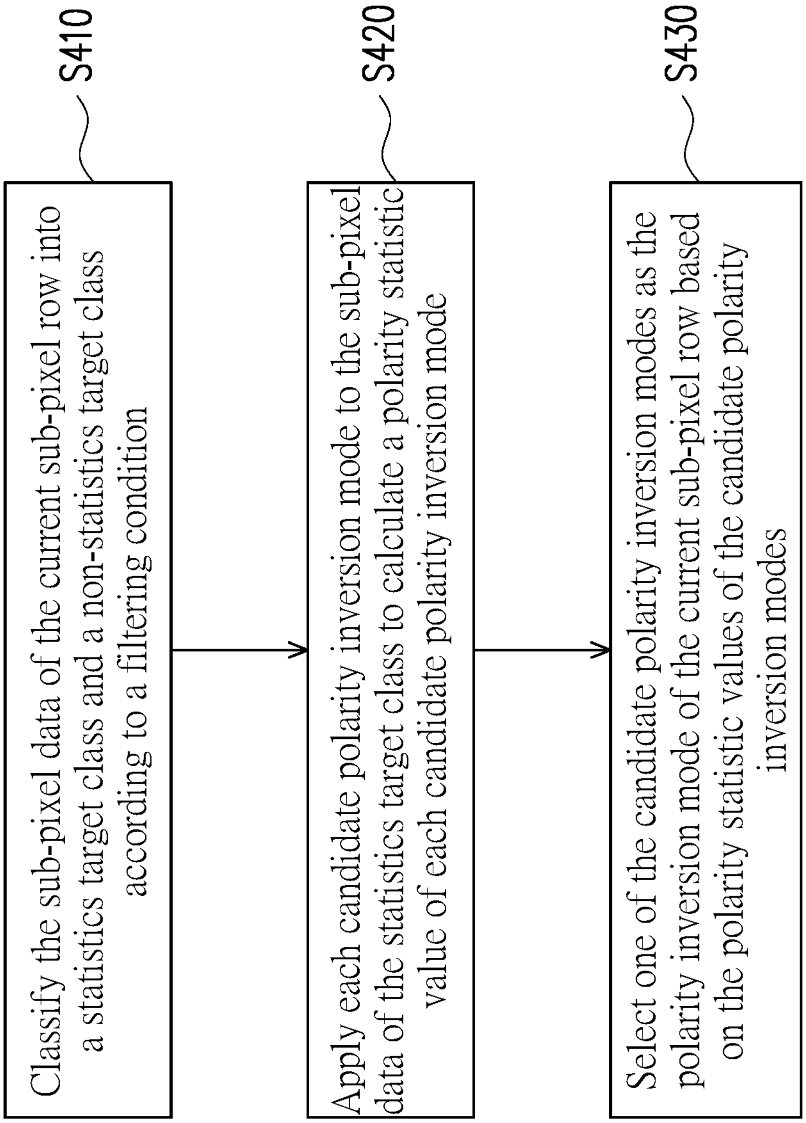
FIG. 4 is a schematic flowchart of the check circuit checking sub-pixel data of a current sub-pixel row according to an embodiment of the disclosure.

For example, the check circuit 220 may perform the process shown in FIG. 4 in step S320. FIG. 4 is a schematic flowchart of the check circuit 220 checking a plurality of sub-pixel data of a current sub-pixel row according to an embodiment of the disclosure. In step S410, the check circuit 220 may classify the plurality of sub-pixel data of the current sub-pixel row into a statistics target class and a non-statistics target class according to a filtering condition, and then counts the sub-pixel data belonging to the statistics target class so as to determine whether to dynamically change the polarity inversion mode of the current sub-pixel row. This embodiment does not limit the filtering condition. In some practical application examples, the filtering condition may include "a certain target sub-pixel data among the plurality of sub-pixel data of the current sub-pixel row is greater than a threshold", where the threshold may be determined depending on the practical design. The check circuit 220 may classify the target sub-pixel data into the statistics target class when the filtering condition is met. The check circuit 220 may classify the target sub-pixel data into the non-statistics target class when the filtering condition is not met. For example, it may be assumed that a range of the sub-pixel data is 0 to 255 (or other ranges), and the threshold is 200 (or other values). The check circuit 220 may classify sub-pixel data greater than or equal to the threshold "200" into the statistics target class, and classify sub-pixel data less than the threshold "200" into the non-statistics target class.

In some practical application examples, the filtering condition may include "a certain target sub-pixel data among the plurality of sub-pixel data of the current sub-pixel row is less than a threshold". The check circuit 220 may classify the target sub-pixel data meeting the filtering condition into the statistics target class, and classify the target sub-pixel data not meeting the filtering condition into the non-statistics target class. For example, it may be assumed that a range of the sub-pixel data is 0 to 255 (or other ranges), and the threshold is 55 (or other values). The check circuit 220 may classify sub-pixel data greater than or equal to the threshold "55" into the non-statistics target class, and classify sub-pixel data less than the threshold "55" into the statistics target class.

In some practical application examples, the filtering condition may include "a certain target sub-pixel data among the plurality of sub-pixel data of the current sub-pixel row is greater than a first threshold, or the target sub-pixel data is less than a second threshold", where the first threshold is greater than the second threshold. The check circuit 220 may classify the target sub-pixel data meeting the filtering condition into the statistics target class, and classify the target sub-pixel data not meeting the filtering condition into the non-statistics target class. For example, it may be assumed that a range of the sub-pixel data is 0 to 255 (or other ranges), the first threshold is 200 (or other values), and the second threshold is 55 (or other values) value). The check circuit 220 may classify sub-pixel data greater than or equal to the first threshold "200" into the statistics target class, classify sub-pixel data between the first threshold "200" and the second threshold "55" into the non-statistics target class, and classify sub-pixel data less than or equal to the second threshold "55" into the statistics target class.

In step S420, the check circuit 220 may apply each of a plurality of candidate polarity inversion modes to the sub-pixel data belonging to the statistics target class to calculate a polarity statistic value of each candidate polarity inversion mode. For example, the check circuit 220 may apply a certain target mode among the candidate polarity inversion modes to the sub-pixel data belonging to the statistics target class in the current sub-pixel row, and then counts a first number of positive polarity sub-pixels and a second number of negative polarity sub-pixels in the sub-pixel data belonging to the statistics target class. The check circuit 220 may calculate a difference between the first number and the second number and take the difference as the polarity statistic value of the target mode.

Figure 5:
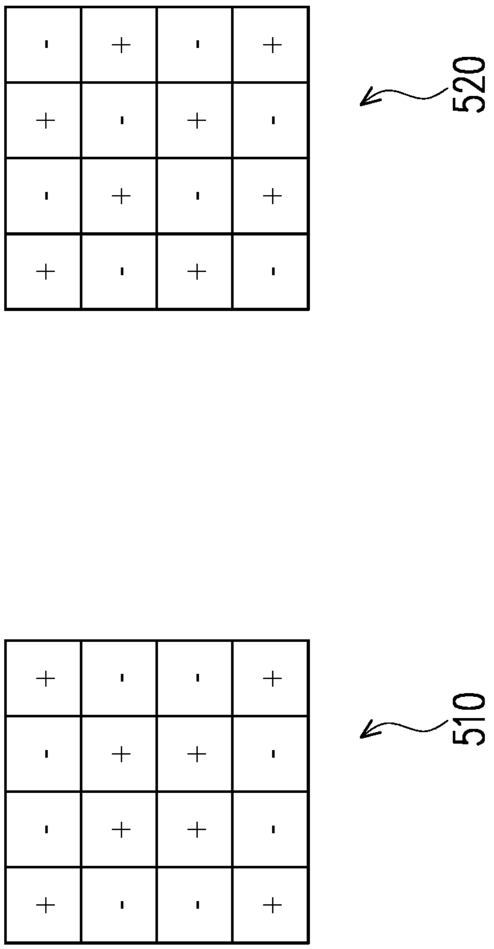
FIG. 5 is a schematic diagram of different candidate polarity inversion modes according to an embodiment of the disclosure.

For example, FIG. 5 is a schematic diagram of different candidate polarity inversion modes according to an embodiment of the disclosure. The symbol "+" as shown in FIG. 5 indicates positive polarity driving, and the symbol "−" as shown in FIG. 5 indicates negative polarity driving. The specific number and content of the candidate polarity inversion modes adopted in step S420 may be determined depending on the practical design, and are not limited to the examples shown in FIG. 5. For each of two candidate polarity inversion modes 510 and 520 as shown in FIG. 5, both a horizontal axis polarity period and a vertical axis polarity period are 4. Nonetheless, the specific polarity periods of the candidate polarity inversion modes adopted in step S420 may be determined depending on the practical design, and are not limited to the examples shown in FIG. 5.

The check circuit 220 may apply each of the candidate polarity inversion modes 510 and 520 to the sub-pixel data belonging to the statistics target class to calculate the polarity statistic value of each candidate polarity inversion mode. Assuming that the current sub-pixel row is the m-th sub-pixel row in the image frame, and the vertical axis polarity period of the candidate polarity inversion mode is n (where n is 4 in the embodiment of FIG. 5), then the check circuit 220 may calculate a remainder r of m/n, and select the r-th row of polarity patterns of the candidate polarity inversion mode to apply to the current sub-pixel row.

For example, the check circuit 220 may apply the candidate polarity inversion mode 520 to the sub-pixel data belonging to the statistics target class in the current sub-pixel row, and then counts a first number of positive polarity sub-pixels and a second number of negative polarity sub-pixels in the sub-pixel data belonging to the statistics target class. Taking FIG. 1 as an example, assuming that the remainder r is 1, then the check circuit 220 may apply the first row of polarity patterns of the candidate polarity inversion mode 520 to the current sub-pixel row (the pixels P1 to P8). Assuming that the filtering condition is "the sub-pixel data is greater than a threshold of 200", then the first number is 8 (the sub-pixels R1, B1, R3, B3, R5, B5, R7, and B7), and the second number is 4 (the sub-pixels G1, G3, G5, and G7). The check circuit 220 calculates that a difference between the first number and the second number is 8−4=+4, and takes the difference +4 as a polarity statistic value of the candidate polarity inversion mode 520.

Figure 6:
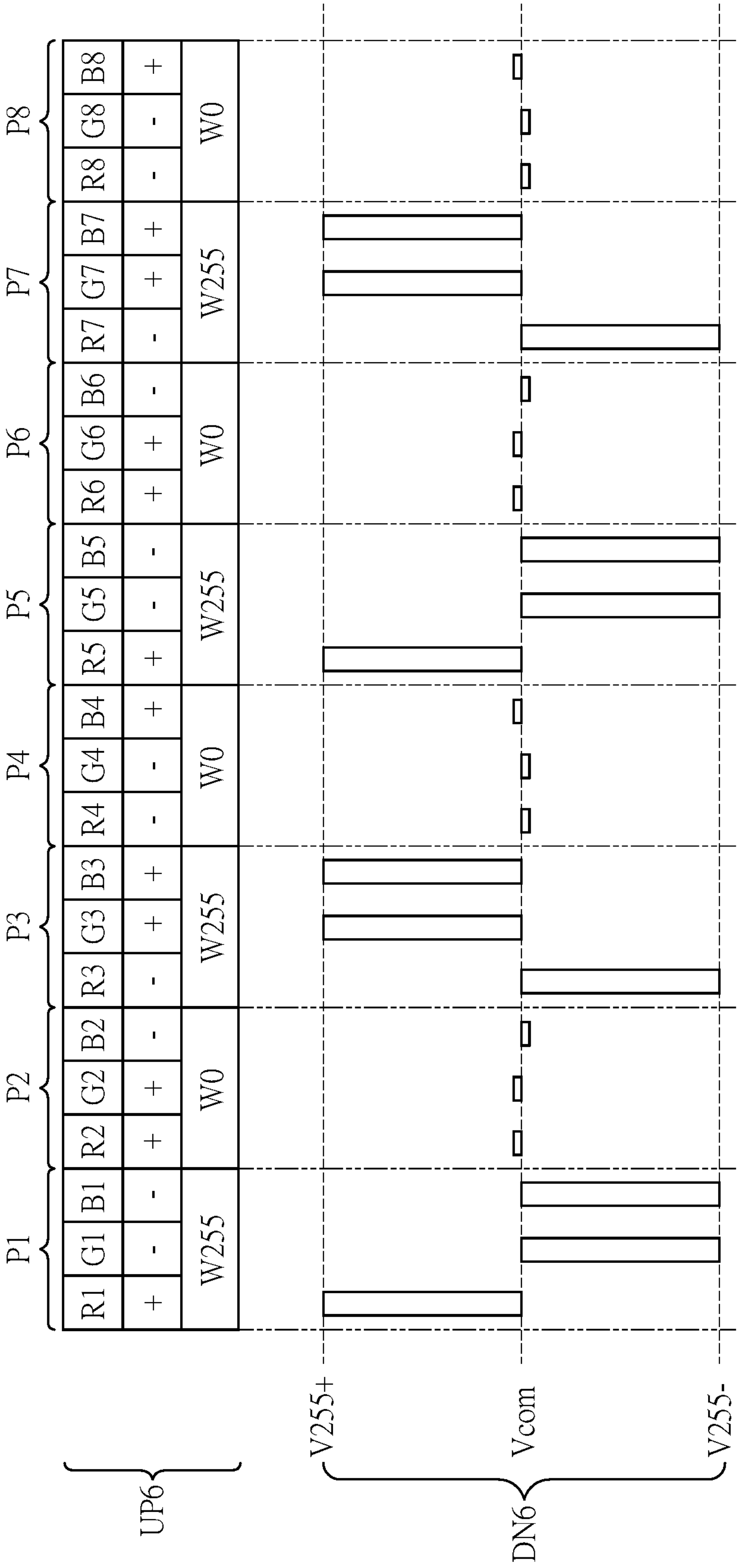
FIG. 6 is a schematic diagram of another polarity inversion mode of a current sub-pixel row.

In addition, the check circuit 220 may apply the candidate polarity inversion mode 510 to the sub-pixel data belonging to the statistics target class in the current sub-pixel row, and then counts a first number of positive polarity sub-pixels and a second number of negative polarity sub-pixels in the sub-pixel data belonging to the statistics target class. FIG. 6 is a schematic diagram of another polarity inversion mode of a current sub-pixel row. The upper part UP6 of FIG. 6 shows the plurality of pixel data P1 to P8 of a current sub-pixel row and a polarity inversion mode thereof. The lower part DN6 of FIG. 6 shows a schematic diagram of voltage levels of driving voltages. Reference may be made to the relevant description of the pixel data P1 to P8 as shown in FIG. 1 for the pixel data P1 to P8 as shown in FIG. 6, which will therefore not be repeatedly described. Taking FIG. 6 as an example, assuming that the remainder r is 1, then the check circuit 220 may apply the first row of polarity patterns of the candidate polarity inversion mode 510 to the current sub-pixel row (the pixels P1 to P8). Assuming that the filtering condition is "the sub-pixel data is greater than a threshold of 200", then the first number is 6 (the sub-pixels R1, G3, B3, R5, G7, and B7), and the second number is 6 (the sub-pixels G1, B1, R3, G5, B5, and R7). The check circuit 220 calculates that a difference between the first number and the second number is 6−6=0, and takes the difference 0 as a polarity statistic value of the candidate polarity inversion mode 510.

In step S430, the check circuit 220 may select one of the candidate polarity inversion modes as the polarity inversion mode of the current sub-pixel row based on the polarity statistic values of the candidate polarity inversion modes. For example, the check circuit 220 may select a minimal polarity statistic value from the polarity statistic values of the candidate polarity inversion modes, and the check circuit 220 may select a candidate polarity inversion mode corresponding to the minimal polarity statistic value as the polarity inversion mode of the current sub-pixel row. Taking the candidate polarity inversion modes 510 and 520 as shown in FIG. 5 as an example, as described in the examples above, the polarity statistic value of the candidate polarity inversion mode 510 is 0, and the polarity statistic value of the candidate polarity inversion mode 520 is +4. The check circuit 220 may select a minimal polarity statistic value 0 from the polarity statistic values 0 and +4, and select the candidate polarity inversion mode 510 corresponding to the minimal polarity statistic value 0 as the polarity inversion mode of the current sub-pixel row.

The specific embodiment of step S320 as shown in FIG. 3 should not be limited to the relevant description of FIG. 4. For example, in other embodiments, the check circuit 220 may perform a pattern detection function (PDF) in step S320 to check the plurality of sub-pixel data of the current sub-pixel row. The check circuit 220 may have one or more characteristics matrices. The dimension of the characteristics matrix may be determined depending on the practical design. For example, the characteristics matrix may be a 1*s matrix, and the number of columns s of the matrix may be any integer (e.g., s is 8) determined depending on the practical design.

The check circuit 220 may binarize the plurality of sub-pixel data of the current sub-pixel row to generate a binarized row. The check circuit 220 may perform the PDF on the binarized row to determine whether the binarized row matches a first characteristics matrix. When a first result of the PDF indicates that the binarized row matches the first characteristics matrix, the check circuit 220 may take a first candidate polarity inversion mode (e.g., the candidate polarity inversion mode 510 as shown in FIG. 5 or other polarity inversion modes) corresponding to the first characteristics matrix as the polarity inversion mode of the current sub-pixel row. When the first result of the PDF indicates that the binarized row does not match the first characteristics matrix, the check circuit 220 may perform the PDF on the binarized row again to determine whether the binarized row matches a second characteristics matrix. When a second result of the PDF indicates that the binarized row matches the second characteristics matrix, the check circuit 220 may take a second candidate polarity inversion mode (e.g., the candidate polarity inversion mode 520 as shown in FIG. 5 or other polarity inversion modes) corresponding to the second characteristics matrix as the polarity inversion mode of the current sub-pixel row. When the binarized row does not match any of the characteristics matrices, the check circuit 220 may take a default polarity inversion mode as the polarity inversion mode of the current sub-pixel row. The default polarity inversion mode may be any polarity inversion mode determined depending on the practical design.

In summary of the above, the check circuit 220 may dynamically change the polarity inversion modes of different sub-pixel rows to perform line-based polarity control (Line based polarity inversion mode adjustment). For example, the check circuit 220 may check the sub-pixel data of the current sub-pixel row in a statistical manner, and then dynamically change/determine the polarity inversion mode of the current sub-pixel row based on the statistical result. Determination of the polarity inversion mode of the current sub-pixel row in the image frame may be independent of (unrelated to) determination of the polarity inversion mode of a previous sub-pixel row in the image frame. Nonetheless, based on the practical applications, in other embodiments, determination of the polarity inversion mode of the current sub-pixel row may depend on determination of the polarity inversion mode of the previous sub-pixel row. For example, in the case where the polarity inversion mode of the previous sub-pixel row is changed from a default mode to a new mode, regardless of the result of the check circuit 220 checking the plurality of sub-pixel data of the current sub-pixel row, the check circuit 220 maintains the polarity inversion mode of the current sub-pixel row in the default mode. In the case where the polarity inversion mode of the previous sub-pixel row is maintained in the default mode, the check circuit 220 dynamically changes the polarity inversion mode of the current sub-pixel row according to the result of checking the plurality of sub-pixel data of the current sub-pixel row (see the relevant description of FIG. 3 for details).

Figure 7:
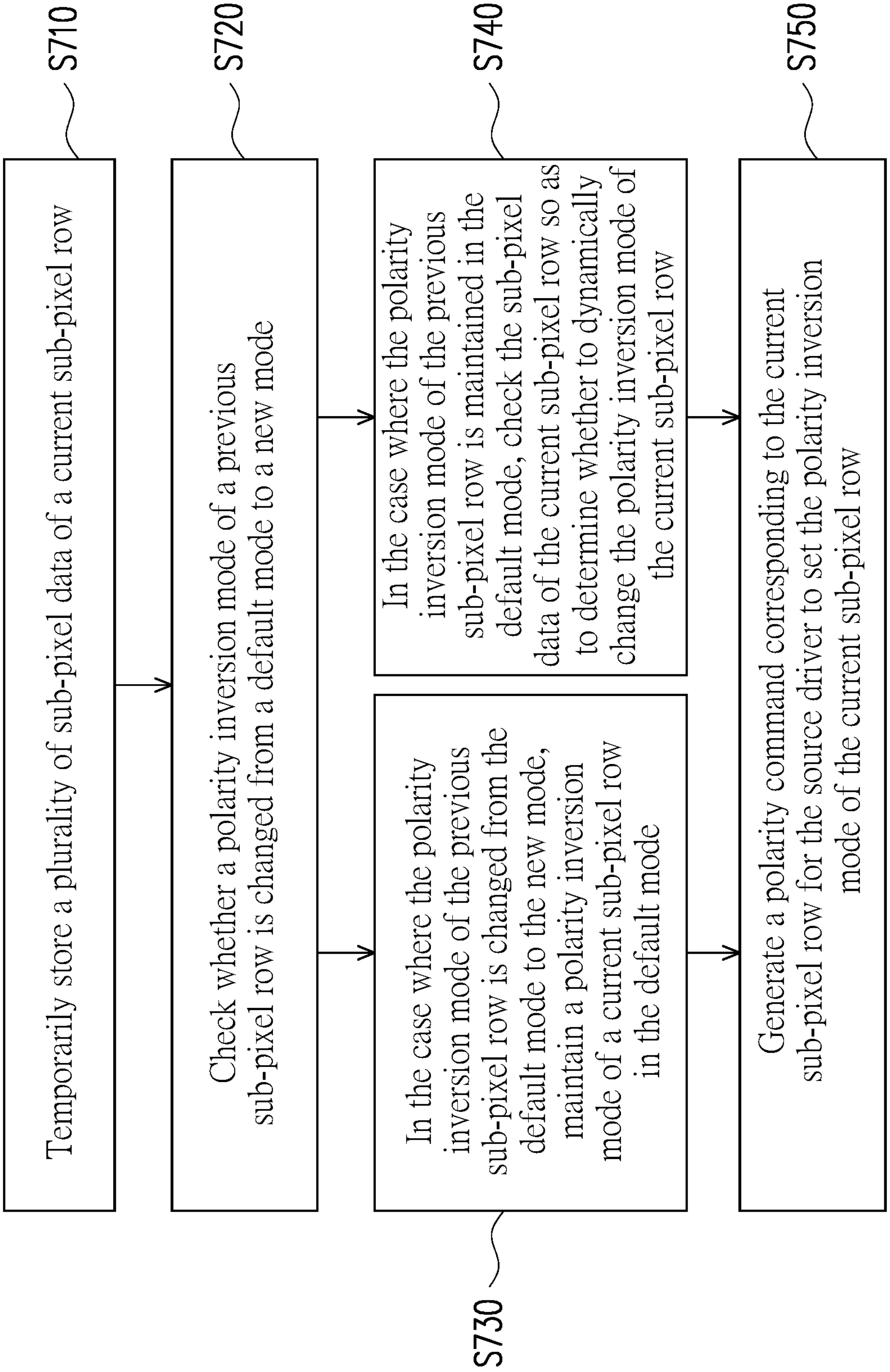
FIG. 7 is a schematic flowchart of a polarity control method of the timing controller according to another embodiment of the disclosure.

FIG. 7 is a schematic flowchart of a polarity control method of the timing controller 200 according to another embodiment of the disclosure. Reference may be made to the relevant description of step S310 as shown in FIG. 3 for step S710 as shown in FIG. 7, which will therefore not be repeatedly described. Reference may be made to FIG. 2 and FIG. 7. In step S720, the check circuit 220 checks whether a polarity inversion mode of a previous sub-pixel row is changed from a default mode to a new mode. In the case where the polarity inversion mode of the previous sub-pixel row is changed from the default mode to the new mode, the check circuit 220 maintains a polarity inversion mode of a current sub-pixel row in the default mode (step S730). In the case where the polarity inversion mode of the previous sub-pixel row is maintained in the default mode, the check circuit 220 checks the plurality of sub-pixel data of the current sub-pixel row so as to determine whether to dynamically change the polarity inversion mode of the current sub-pixel row (step S740). Analogy may be made with reference to the relevant description of step S320 as shown in FIG. 3 for the detailed operation of step S740, which will therefore not be repeatedly described. In step S750, the check circuit 220 generates a polarity command corresponding to the current sub-pixel row for the source driver 20 to set the polarity inversion mode of the current sub-pixel row. Reference may be made to the relevant description of step S330 as shown in FIG. 3 for step S750 as shown in FIG. 7, which will therefore not be repeatedly described.

In summary of the above, the timing controller 200 may perform line-based polarity control. The timing controller 200 may check the plurality of sub-pixel data of the current sub-pixel row so as to determine whether to dynamically change the polarity inversion mode of the current sub-pixel row. For example, the timing controller 200 may select one of the plurality of candidate polarity inversion modes as the polarity inversion mode of the current sub-pixel row according to the plurality of sub-pixel data of the current sub-pixel row, to maximally reduce the coupling effects of the plurality of driving voltages (grayscale voltages) of the current sub-pixel row on the common voltage Vcom of the display panel 30. Therefore, the timing controller 200 may reduce the level drift of the common voltage Vcom.

Figure 8:
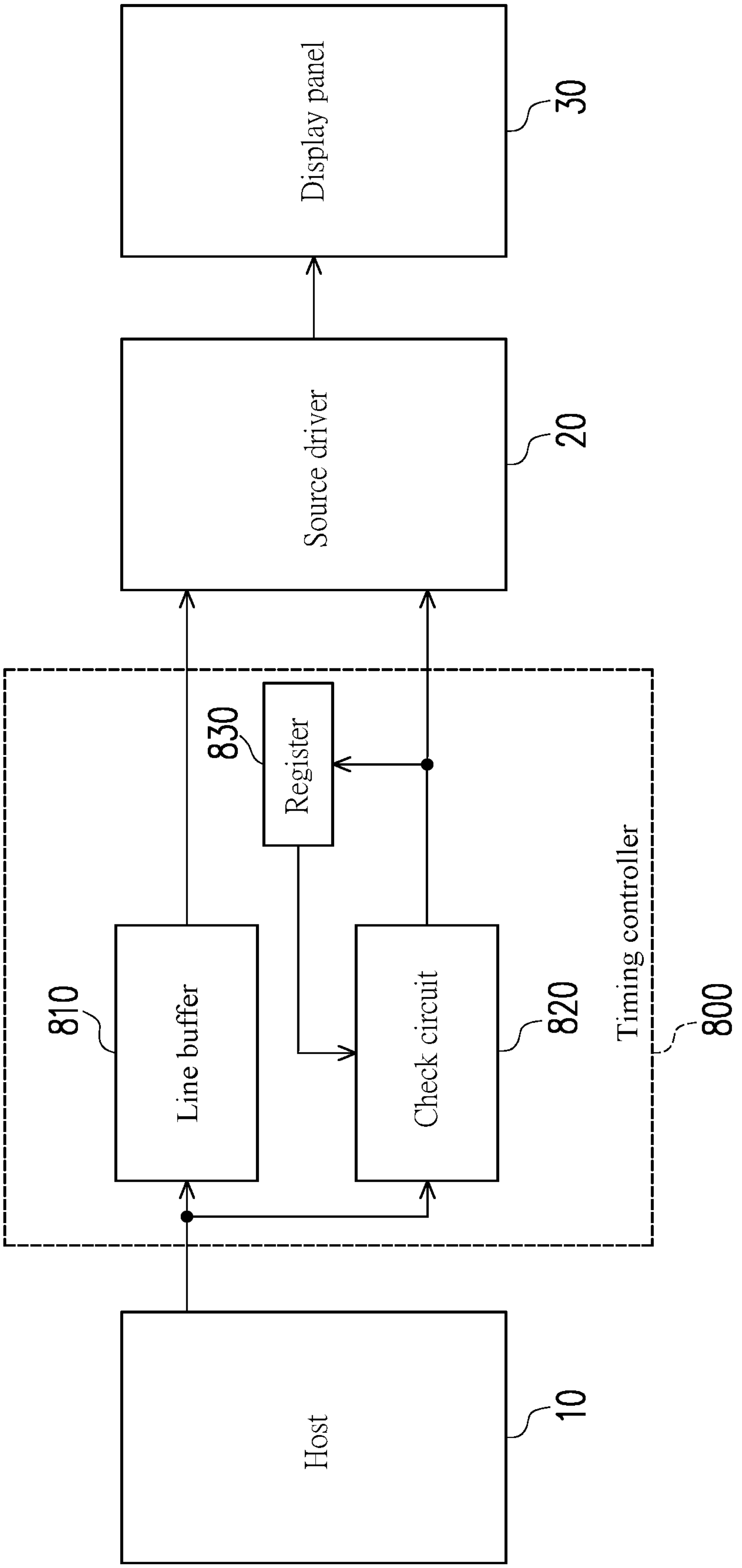
FIG. 8 is a schematic circuit block diagram of a timing controller according to another embodiment of the disclosure.

FIG. 8 is a schematic circuit block diagram of a timing controller 800 according to another embodiment of the disclosure. Analogy may be made with reference to the relevant description of the host 10, the timing controller 200, the source driver 20, and the display panel as shown in FIG. 2 for the host 10, the timing controller 800, the source driver 20, and the display panel 30 as shown in FIG. 8, which will therefore not be repeatedly described. In the embodiment shown in FIG. 8, the timing controller 800 includes a line buffer 810, a check circuit 820, and a register 830. Analogy may be made with reference to the relevant description of the line buffer 210 and the check circuit 220 as shown in FIG. 2 for the line buffer 810 and the check circuit 820 as shown in FIG. 8, which will therefore not be repeatedly described.

In the embodiment shown in FIG. 8, the register 830 is coupled to the check circuit 820. The register 830 may temporarily store a polarity command corresponding to a current sub-pixel row, and provide a polarity command corresponding to a previous sub-pixel row to the check circuit. In the case where the polarity command corresponding to the previous sub-pixel row indicates that a polarity inversion mode of the previous sub-pixel row is changed from a default mode to a new mode, the check circuit 820 maintains a polarity inversion mode of the current sub-pixel row in the default mode. In the case where the polarity command corresponding to the previous sub-pixel row indicates that the polarity inversion mode of the previous sub-pixel row is maintained in the default mode, the check circuit 820 dynamically changes the polarity inversion mode of the current sub-pixel row according to a result of checking the plurality of sub-pixel data of the current sub-pixel row. Analogy may be made with reference to the relevant description of step S320 as shown in FIG. 3 for the detailed operation of the check circuit 820 checking the current sub-pixel row, which will therefore not be repeatedly described.

Depending on different design requirements, in some embodiments, the check circuit 220 and/or 820 may be realized as a hardware circuit. In other embodiments, the check circuit 220 and/or 820 may be realized as firmware, software (i.e., programs), or a combination of them. In other embodiments, the check circuit 220 and/or 820 may be realized as a combination of multiple of hardware, firmware, and software.

In terms of hardware form, the check circuit 220 and/or 820 may be realized as a logic circuit on an integrated circuit (IC). For example, the relevant functions of the check circuit 220 and/or 820 may be realized as various logic blocks, modules, and circuits in one or more controllers, microcontrollers, microprocessors, application-specific integrated circuits (ASICs), digital signal processors (DSPs), field programmable gate arrays (FPGAs), and/or other processing units. The relevant functions of the check circuit 220 and/or 820 may be realized as hardware circuit, such as various logic blocks, modules, and circuits in an IC, by utilizing hardware description languages (e.g., Verilog HDL or VHDL) or other suitable programming languages.

In terms of software form and/or firmware form, the relevant functions of the check circuit 220 and/or 820 may be realized as programming codes. For example, the check circuit 220 and/or 820 may be realized by utilizing general programming languages (e.g., C, C++, or assembly language) or other suitable programming languages. The programming codes may be recorded/stored in a "non-transitory computer readable medium". In some embodiments, the non-transitory computer readable medium includes, for example, a semiconductor memory and/or a storage device. The semiconductor memory includes a memory card, read only memory (ROM), flash memory, a programmable logic circuit, or other semiconductor memory. The storage device includes a tape, a disk, a hard disk drive (HDD), a solid-state drive (SSD), or other storage devices. Electronic equipment (e.g., a central processing unit (CPU), a controller, a microcontroller, a or microprocessor) may read and execute the programming codes from the non-transitory computer readable medium so as to realize the relevant functions of the check circuit 220 and/or 820.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A timing controller comprising:

a line buffer configured to temporarily store a plurality of sub-pixel data of a current sub-pixel row in an image frame so as to transmit the plurality of sub-pixel data of the current sub-pixel row to a source driver; and a check circuit configured to generate a polarity command corresponding to the current sub-pixel row for the source driver to set a polarity inversion mode of the current sub-pixel row, wherein the check circuit checks the plurality of sub-pixel data of the current sub-pixel row so as to determine whether to dynamically change the polarity inversion mode of the current sub-pixel row, the check circuit classifies the plurality of sub-pixel data of the current sub-pixel row into a statistics target class and a non-statistics target class according to whether a filtering condition is met; and the filtering condition comprises comparing a target sub-pixel data among the plurality of sub-pixel data of the current sub-pixel row with a threshold, wherein the check circuit applies each of at least three of candidate polarity inversion modes to the sub-pixel data belonging to the statistics target class to calculate a polarity statistic value of each of the candidate polarity inversion modes, and the check circuit selects one of the candidate polarity inversion modes as the polarity inversion mode of the current sub-pixel row based on the polarity statistic values of the candidate polarity inversion modes.

2. The timing controller according to claim 1, wherein the check circuit transmits the polarity command corresponding to the current sub-pixel row to the source driver synchronously with the line buffer transmitting the plurality of sub-pixel data of the current sub-pixel row to the source driver.

3. The timing controller according to claim 1, wherein the filtering condition comprises "the target sub-pixel data among the plurality of sub-pixel data of the current sub-pixel row is greater than the threshold", the check circuit classifies the target sub-pixel data into the statistics target class when the filtering condition is met, and the check circuit classifies the target sub-pixel data into the non-statistics target class when the filtering condition is not met.

4. The timing controller according to claim 1, wherein the filtering condition comprises "the target sub-pixel data among the plurality of sub-pixel data of the current sub-pixel row is less than the threshold", the check circuit classifies the target sub-pixel data into the statistics target class when the filtering condition is met, and the check circuit classifies the target sub-pixel data into the non-statistics target class when the filtering condition is not met.

5. The timing controller according to claim 1, wherein the filtering condition comprises "the target sub-pixel data among the plurality of sub-pixel data of the current sub-pixel row is greater than a first threshold of the threshold, or the target sub-pixel data is less than a second threshold of the threshold", where the first threshold is greater than the second threshold, the check circuit classifies the target sub-pixel data into the statistics target class when the filtering condition is met, and the check circuit classifies the target sub-pixel data into the non-statistics target class when the filtering condition is not met.

6. The timing controller according to claim 1, wherein the check circuit applies a target mode among the candidate polarity inversion modes to the sub-pixel data belonging to the statistics target class in the current sub-pixel row, the check circuit counts a first number of positive polarity sub-pixels and a second number of negative polarity sub-pixels in the sub-pixel data belonging to the statistics target class, the check circuit calculates a difference between the first number and the second number, and the check circuit takes the difference as the polarity statistic value of the target mode.

7. The timing controller according to claim 1, wherein the check circuit selects a minimal polarity statistic value from the polarity statistic values of the candidate polarity inversion modes, and the check circuit selects a candidate polarity inversion mode corresponding to the minimal polarity statistic value as the polarity inversion mode of the current sub-pixel row.

8. The timing controller according to claim 1, wherein the check circuit binarizes the plurality of sub-pixel data of the current sub-pixel row to generate a binarized row, the check circuit performs a pattern detection function on the binarized row to determine whether the binarized row matches a first characteristics matrix, and the check circuit takes a first candidate polarity inversion mode corresponding to the first characteristics matrix as the polarity inversion mode of the current sub-pixel row when a first result of the pattern detection function indicates that the binarized row matches the first characteristics matrix.

9. The timing controller according to claim 8, wherein the check circuit performs the pattern detection function on the binarized row again to determine whether the binarized row matches a second characteristics matrix when the first result of the pattern detection function indicates that the binarized row does not match the first characteristics matrix, and the check circuit takes a second candidate polarity inversion mode corresponding to the second characteristics matrix as the polarity inversion mode of the current sub-pixel row when a second result of the pattern detection function indicates that the binarized row matches the second characteristics matrix.

10. The timing controller according to claim 1, wherein determination of the polarity inversion mode of the current sub-pixel row is independent of determination of a polarity inversion mode of a previous sub-pixel row in the image frame.

11. The timing controller according to claim 1, wherein, in the case where a polarity inversion mode of a previous sub-pixel row in the image frame is changed from a default mode to a new mode, the check circuit maintains the polarity inversion mode of the current sub-pixel row in the default mode regardless of a result of the check circuit checking the plurality of sub-pixel data of the current sub-pixel row; and in the case where the polarity inversion mode of the previous sub-pixel row is maintained in the default mode, the check circuit dynamically changes the polarity inversion mode of the current sub-pixel row according to the result of checking the plurality of sub-pixel data of the current sub-pixel row.

12. The timing controller according to claim 1, further comprising:

a register, coupled to the check circuit, and configured to temporarily store the polarity command corresponding to the current sub-pixel row and provide a polarity command corresponding to a previous sub-pixel row in the image frame to the check circuit, wherein, in the case where the polarity command corresponding to the previous sub-pixel row indicates that a polarity inversion mode of the previous sub-pixel row is changed from a default mode to a new mode, the check circuit maintains the polarity inversion mode of the current sub-pixel row in the default mode regardless of a result of the check circuit checking the plurality of sub-pixel data of the current sub-pixel row; and in the case where the polarity command corresponding to the previous sub-pixel row indicates that the polarity inversion mode of the previous sub-pixel row is maintained in the default mode, the check circuit dynamically changes the polarity inversion mode of the current sub-pixel row according to the result of checking the plurality of sub-pixel data of the current sub-pixel row.

13. A polarity control method of a timing controller, comprising:

temporarily storing a plurality of sub-pixel data of a current sub-pixel row in an image frame by a line buffer of the timing controller so as to transmit the plurality of sub-pixel data of the current sub-pixel row to a source driver;

checking the plurality of sub-pixel data of the current sub-pixel row by a check circuit of the timing controller so as to determine whether to dynamically change a polarity inversion mode of the current sub-pixel row;

classifying the plurality of sub-pixel data of the current sub-pixel row into a statistics target class and a non-statistics target class according to whether a filtering condition is met, wherein the filtering condition comprises comparing a target sub-pixel data among the plurality of sub-pixel data of the current sub-pixel row with a threshold;

applying each of at least three of candidate polarity inversion modes to the sub-pixel data belonging to the statistics target class to calculate a polarity statistic value of each of the candidate polarity inversion modes;

selecting one of the candidate polarity inversion modes as the polarity inversion mode of the current sub-pixel row based on the polarity statistic values of the candidate polarity inversion modes; and generating a polarity command corresponding to the current sub-pixel row by the check circuit for the source driver to set the polarity inversion mode of the current sub-pixel row.

14. The polarity control method according to claim 13, further comprising:

transmitting the polarity command corresponding to the current sub-pixel row to the source driver by the check circuit synchronously with the line buffer transmitting the plurality of sub-pixel data of the current sub-pixel row to the source driver.

15. The polarity control method according to claim 13, wherein the filtering condition comprises "the target sub-pixel data among the plurality of sub-pixel data of the current sub-pixel row is greater than the threshold", and the polarity control method further comprises:

classifying the target sub-pixel data into the statistics target class when the filtering condition is met; and classifying the target sub-pixel data into the non-statistics target class when the filtering condition is not met.

16. The polarity control method according to claim 13, wherein the filtering condition comprises "the target sub-pixel data among the plurality of sub-pixel data of the current sub-pixel row is less than the threshold", and the polarity control method further comprises:

classifying the target sub-pixel data into the statistics target class when the filtering condition is met; and classifying the target sub-pixel data into the non-statistics target class when the filtering condition is not met.

17. The polarity control method according to claim 13, wherein the filtering condition comprises "the target sub-pixel data among the plurality of sub-pixel data of the current sub-pixel row is greater than a first threshold of the threshold, or the target sub-pixel data is less than a second threshold of the threshold", where the first threshold is greater than the second threshold, and the polarity control method further comprises:

classifying the target sub-pixel data into the statistics target class when the filtering condition is met; and classifying the target sub-pixel data into the non-statistics target class when the filtering condition is not met.

18. The polarity control method according to claim 13, further comprising:

applying a target mode among the candidate polarity inversion modes to the sub- pixel data belonging to the statistics target class in the current sub-pixel row;

counting a first number of positive polarity sub-pixels and a second number of negative polarity sub-pixels in the sub-pixel data belonging to the statistics target class;

calculating a difference between the first number and the second number; and taking the difference as the polarity statistic value of the target mode.

19. The polarity control method according to claim 13, further comprising:

selecting a minimal polarity statistic value from the polarity statistic values of the candidate polarity inversion modes; and selecting a candidate polarity inversion mode corresponding to the minimal polarity statistic value as the polarity inversion mode of the current sub-pixel row.

20. The polarity control method according to claim 13, further comprising:

binarizing the plurality of sub-pixel data of the current sub-pixel row to generate a binarized row;

performing a pattern detection function on the binarized row to determine whether the binarized row matches a first characteristics matrix; and taking a first candidate polarity inversion mode corresponding to the first characteristics matrix as the polarity inversion mode of the current sub-pixel row when a first result of the pattern detection function indicates that the binarized row matches the first characteristics matrix.

21. The polarity control method according to claim 20, further comprising:

performing the pattern detection function on the binarized row again to determine whether the binarized row matches a second characteristics matrix when the first result of the pattern detection function indicates that the binarized row does not match the first characteristics matrix; and taking a second candidate polarity inversion mode corresponding to the second characteristics matrix as the polarity inversion mode of the current sub-pixel row when a second result of the pattern detection function indicates that the binarized row matches the second characteristics matrix.

22. The polarity control method according to claim 13, wherein determination of the polarity inversion mode of the current sub-pixel row is independent of determination of a polarity inversion mode of a previous sub-pixel row in the image frame.

23. The polarity control method according to claim 13, further comprising:

in the case where a polarity inversion mode of a previous sub-pixel row in the image frame is changed from a default mode to a new mode, maintaining the polarity inversion mode of the current sub-pixel row in the default mode regardless of a result of the check circuit checking the plurality of sub-pixel data of the current sub-pixel row; and in the case where the polarity inversion mode of the previous sub-pixel row is maintained in the default mode, dynamically changing the polarity inversion mode of the current sub-pixel row according to the result of checking the plurality of sub-pixel data of the current sub-pixel row.

24. A timing controller, comprising:

a line buffer configured to temporarily store a plurality of sub-pixel data of a current sub-pixel row in an image frame so as to transmit the plurality of sub-pixel data of the current sub-pixel row to a source driver; and a check circuit configured to check whether a polarity inversion mode of a previous sub-pixel row in the image frame is changed from a default mode to a new mode, wherein the check circuit generates a polarity command corresponding to the current sub-pixel row for the source driver to set a polarity inversion mode of the current sub-pixel row, in the case where the polarity inversion mode of the previous sub-pixel row is changed from the default mode to the new mode, the check circuit maintains the polarity inversion mode of the current sub-pixel row in the default mode, in the case where the polarity inversion mode of the previous sub-pixel row is maintained in the default mode, the check circuit checks the plurality of sub-pixel data of the current sub-pixel row so as to determine whether to dynamically change the polarity inversion mode of the current sub-pixel row, the check circuit classifies the plurality of sub-pixel data of the current sub-pixel row into a statistics target class and a non-statistics target class according to whether a filtering condition is met, and the filtering condition comprises comparing a target sub-pixel data among the plurality of sub-pixel data of the current sub-pixel row with a threshold, wherein the check circuit applies each of at least three of candidate polarity inversion modes to the sub-pixel data belonging to the statistics target class to calculate a polarity statistic value of each of the candidate polarity inversion modes, and in the case where the polarity inversion mode of the previous sub-pixel row is maintained in the default mode, the check circuit selects one of the candidate polarity inversion modes as the polarity inversion mode of the current sub-pixel row based on the polarity statistic values of the candidate polarity inversion modes.

25. The timing controller according to claim 24, further comprising:

a register, coupled to the check circuit, and configured to temporarily store the polarity command corresponding to the current sub-pixel row and provide a polarity command corresponding to the previous sub-pixel row to the check circuit, wherein, in the case where the polarity command corresponding to the previous sub-pixel row indicates that the polarity inversion mode of the previous sub-pixel row is changed to the new mode, the check circuit maintains the polarity inversion mode of the current sub-pixel row in the default mode; and in the case where the polarity command corresponding to the previous sub-pixel row indicates that the polarity inversion mode of the previous sub-pixel row is maintained in the default mode, the check circuit dynamically changes the polarity inversion mode of the current sub-pixel row according to a result of checking the plurality of sub-pixel data of the current sub-pixel row.

26. The timing controller according to claim 24, wherein the check circuit transmits the polarity command corresponding to the current sub-pixel row to the source driver synchronously with the line buffer transmitting the plurality of sub-pixel data of the current sub-pixel row to the source driver.

27. The timing controller according to claim 24, wherein the filtering condition comprises "the target sub-pixel data among the plurality of sub-pixel data of the current sub-pixel row is greater than the threshold", the check circuit classifies the target sub-pixel data into the statistics target class when the filtering condition is met, and the check circuit classifies the target sub-pixel data into the non-statistics target class when the filtering condition is not met.

28. The timing controller according to claim 24, wherein the filtering condition comprises "the target sub-pixel data among the plurality of sub-pixel data of the current sub-pixel row is less than the threshold", the check circuit classifies the target sub-pixel data into the statistics target class when the filtering condition is met, and the check circuit classifies the target sub-pixel data into the non-statistics target class when the filtering condition is not met.

29. The timing controller according to claim 24, wherein the filtering condition comprises "the target sub-pixel data among the plurality of sub-pixel data of the current sub-pixel row is greater than a first threshold of the threshold, or the target sub-pixel data is less than a second threshold of the threshold", where the first threshold is greater than the second threshold, the check circuit classifies the target sub-pixel data into the statistics target class when the filtering condition is met, and the check circuit classifies the target sub-pixel data into the non-statistics target class when the filtering condition is not met.

30. The timing controller according to claim 24, wherein the check circuit applies a target mode among the candidate polarity inversion modes to the sub-pixel data belonging to the statistics target class in the current sub-pixel row, the check circuit counts a first number of positive polarity sub-pixels and a second number of negative polarity sub-pixels in the sub-pixel data belonging to the statistics target class, the check circuit calculates a difference between the first number and the second number, and the check circuit takes the difference as the polarity statistic value of the target mode.

31. The timing controller according to claim 24, wherein the check circuit selects a minimal polarity statistic value from the polarity statistic values of the candidate polarity inversion modes, and in the case where the polarity inversion mode of the previous sub-pixel row is maintained in the default mode, the check circuit selects a candidate polarity inversion mode corresponding to the minimal polarity statistic value as the polarity inversion mode of the current sub-pixel row.

32. The timing controller according to claim 24, wherein the check circuit binarizes the plurality of sub-pixel data of the current sub-pixel row to generate a binarized row, the check circuit performs a pattern detection function on the binarized row to determine whether the binarized row matches a first characteristics matrix, and in the case where the polarity inversion mode of the previous sub-pixel row is maintained in the default mode, the check circuit takes a first candidate polarity inversion mode corresponding to the first characteristics matrix as the polarity inversion mode of the current sub-pixel row when a first result of the pattern detection function indicates that the binarized row matches the first characteristics matrix.

33. The timing controller according to claim 32, wherein the check circuit performs the pattern detection function on the binarized row again to determine whether the binarized row matches a second characteristics matrix when the first result of the pattern detection function indicates that the binarized row does not match the first characteristics matrix, and in the case where the polarity inversion mode of the previous sub-pixel row is maintained in the default mode, the check circuit takes a second candidate polarity inversion mode corresponding to the second characteristics matrix as the polarity inversion mode of the current sub-pixel row when a second result of the pattern detection function indicates that the binarized row matches the second characteristics matrix.

34. A polarity control method of a timing controller, comprising:

temporarily storing a plurality of sub-pixel data of a current sub-pixel row in an image frame by a line buffer of the timing controller so as to transmit the plurality of sub-pixel data of the current sub-pixel row to a source driver;

checking whether a polarity inversion mode of a previous sub-pixel row in the image frame is changed from a default mode to a new mode by a check circuit of the timing controller;

in the case where the polarity inversion mode of the previous sub-pixel row is changed from the default mode to the new mode, maintaining a polarity inversion mode of the current sub-pixel row in the default mode by the check circuit;

in the case where the polarity inversion mode of the previous sub-pixel row is maintained in the default mode, checking the plurality of sub-pixel data of the current sub-pixel row by the check circuit so as to determine whether to dynamically change the polarity inversion mode of the current sub-pixel row;

classifying the plurality of sub-pixel data of the current sub-pixel row into a statistics target class and a non-statistics target class according to whether a filtering condition is met, wherein the filtering condition comprises comparing a target sub-pixel data among the plurality of sub-pixel data of the current sub-pixel row with a threshold;

applying each of at least three of candidate polarity inversion modes to the sub-pixel data belonging to the statistics target class to calculate a polarity statistic value of each of the candidate polarity inversion modes;

in the case where the polarity inversion mode of the previous sub-pixel row is maintained in the default mode, selecting one of the candidate polarity inversion modes as the polarity inversion mode of the current sub-pixel row based on the polarity statistic values of the candidate polarity inversion modes; and generating a polarity command corresponding to the current sub-pixel row by the check circuit for the source driver to set the polarity inversion mode of the current sub-pixel row.

35. The polarity control method according to claim 34, further comprising:

transmitting the polarity command corresponding to the current sub-pixel row to the source driver by the check circuit synchronously with the line buffer transmitting the plurality of sub-pixel data of the current sub-pixel row to the source driver.

36. The polarity control method according to claim 34, wherein the filtering condition comprises "the target sub-pixel data among the plurality of sub-pixel data of the current sub-pixel row is greater than the threshold", and the polarity control method further comprises:

classifying the target sub-pixel data into the statistics target class when the filtering condition is met; and classifying the target sub-pixel data into the non-statistics target class when the filtering condition is not met.

37. The polarity control method according to claim 34, wherein the filtering condition comprises "the target sub-pixel data among the plurality of sub-pixel data of the current sub-pixel row is less than the threshold", and the polarity control method further comprises:

classifying the target sub-pixel data into the statistics target class when the filtering condition is met; and classifying the target sub-pixel data into the non-statistics target class when the filtering condition is not met.

38. The polarity control method according to claim 34, wherein the filtering condition comprises "the target sub-pixel data among the plurality of sub-pixel data of the current sub-pixel row is greater than a first threshold of the threshold, or the target sub-pixel data is less than a second threshold of the threshold", where the first threshold is greater than the second threshold, and the polarity control method further comprises:

classifying the target sub-pixel data into the statistics target class when the filtering condition is met; and classifying the target sub-pixel data into the non-statistics target class when the filtering condition is not met.

39. The polarity control method according to claim 34, further comprising:

applying a target mode among the candidate polarity inversion modes to the sub-pixel data belonging to the statistics target class in the current sub-pixel row;

counting a first number of positive polarity sub-pixels and a second number of negative polarity sub-pixels in the sub-pixel data belonging to the statistics target class;

calculating a difference between the first number and the second number; and taking the difference as the polarity statistic value of the target mode.

40. The polarity control method according to claim 34, further comprising:

selecting a minimal polarity statistic value from the polarity statistic values of the candidate polarity inversion modes; and in the case where the polarity inversion mode of the previous sub-pixel row is maintained in the default mode, selecting a candidate polarity inversion mode corresponding to the minimal polarity statistic value as the polarity inversion mode of the current sub-pixel row.

41. The polarity control method according to claim 34, further comprising:

binarizing the plurality of sub-pixel data of the current sub-pixel row to generate a binarized row;

performing a pattern detection function on the binarized row to determine whether the binarized row matches a first characteristics matrix; and in the case where the polarity inversion mode of the previous sub-pixel row is maintained in the default mode, taking a first candidate polarity inversion mode corresponding to the first characteristics matrix as the polarity inversion mode of the current sub-pixel row when a first result of the pattern detection function indicates that the binarized row matches the first characteristics matrix.

42. The polarity control method according to claim 41, further comprising:

performing the pattern detection function on the binarized row again to determine whether the binarized row matches a second characteristics matrix when the first result of the pattern detection function indicates that the binarized row does not match the first characteristics matrix; and in the case where the polarity inversion mode of the previous sub-pixel row is maintained in the default mode, taking a second candidate polarity inversion mode corresponding to the second characteristics matrix as the polarity inversion mode of the current sub-pixel row when a second result of the pattern detection function indicates that the binarized row matches the second characteristics matrix.

* * * * *